No. 713,334. Patented Nov. 11, 1902.
O. NIEHAUS.
RAIL JOINT.
(Application filed June 4, 1902.)
(No Model.)

Witnesses,

Inventor,
Otto Niehaus
By Dewey Strong & Co.
Attys

UNITED STATES PATENT OFFICE.

OTTO NIEHAUS, OF WEST BERKELEY, CALIFORNIA.

RAIL-JOINT.

SPECIFICATION forming part of Letters Patent No. 713,334, dated November 11, 1902.

Application filed June 4, 1902. Serial No. 110,175. (No model.)

*To all whom it may concern:*

Be it known that I, OTTO NIEHAUS, a citizen of the United States, residing at West Berkeley, county of Alameda, State of California, have invented an Improvement in Rail-Joints; and I hereby declare the following to be a full, clear, and exact description of the same.

My invention relates generally to improvements in joinery, and particularly in means for joining or splicing the sections of stair-rails and the like. Its primary object has been to devise means of locking an ordinary round-headed carriage-bolt against turning while the nut is being screwed on or, conversely, to anchor a nut set in a mortise while a bolt is being screwed into the nut.

With stair-rails heretofore it has been common to employ splice-bolts having right and left threads at either end screwing into like threaded sockets in the adjacent ends of the rail-sections; but the chief objection to them, as to many other special forms of bolts, has been their cost.

The ultimate object of my invention has been to make use of the common carriage-bolt for this purpose, requiring in addition merely an inexpensive means of rapidly setting the headed end of the bolt permanently in the end of one section and the nut permanently in the end of the other section, so that when the sections are brought together in axial alinement the bolt may be screwed into the nut and the parts quickly tightened and prevented from pulling apart.

The invention consists of a washer having lateral projections or prongs and a central polygonal perforation, said washer fitting over a bolt and adapted when the prongs are driven into the wood to prevent the bolt from turning. The nut may be embraced by a similar washer and be anchored in a similar manner.

It comprises details which will be more fully set forth hereinafter, having reference to the accompanying drawings, in which—

Figure 1:
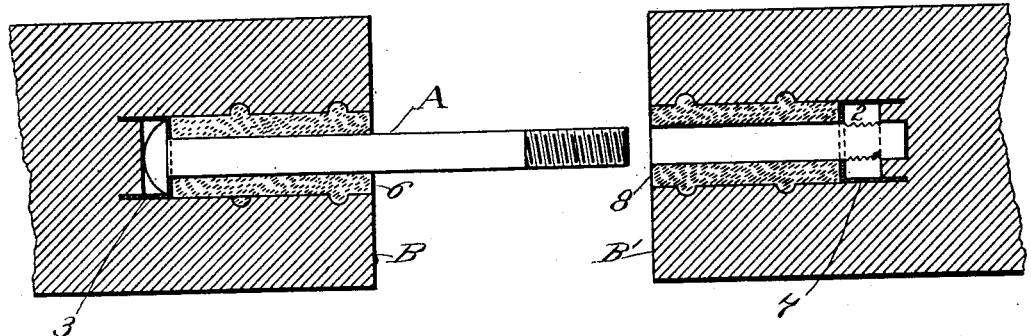
Figure 2:
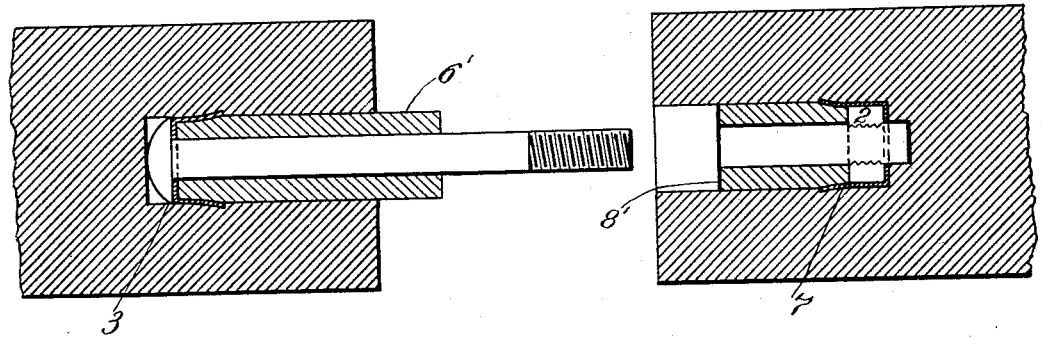
Figure 3:
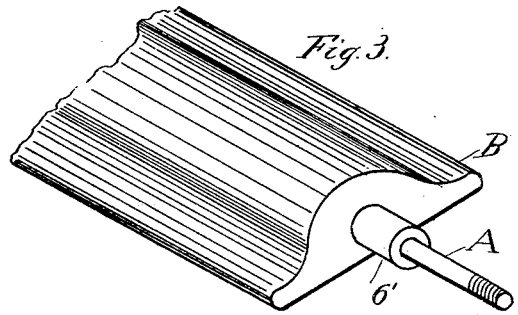
Figure 4:
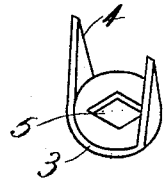

Figure 1 is a sectional view of one form of my invention, showing the prongs of the washer driven in the bottom of the socket and the space around the bolt filled with cement or the like. Fig. 2 is a sectional view of a modified form of my invention. Fig. 3 is a perspective view of a rail with bushing-bolt inserted. Fig. 4 is a perspective view of the washer.

A represents an ordinary round-headed carriage-bolt, and 2 the nut thereof. Frequently it is desired to lock one or the other, or both, of these parts against turning where two timbers or pieces of wood are to be drawn together. This may be done conveniently by means of a washer 3, having the tapered projections or prongs 4 upon its perimeter and the central polygonal perforation 5. The length of the prongs is greater than the thickness of a nut or bolt head, as it is often intended that they shall inclose one or the other and be driven into the wood against which the head or nut may rest, as shown, for instance, in Fig. 1.

In applying my invention to stair-rail joints the adjacent ends of two rail-sections B B' are centrally bored to receive the bolt and nut, and the combined length of these bores is approximately the length of the bolt.

In operation the headed end of the bolt is inserted into the socket in one section, and a washer 3 is then slipped over the bolt, with the prongs either embracing the head and driven into the bottom of the socket by any suitable means, as shown in Fig. 1, the space around the bolt being subsequently filled by a wood bushing, cement, as 6, plaster-of-paris, or a mixture of sulfur and sand or the like, or, as in Fig. 2, with the prongs extending in the direction of the threaded end of the bolt and said prongs subsequently expanded and driven into the walls of the socket by suitable means, as a cylinder or bushing 6'. In either instance the bolt is firmly anchored and prevented from turning by reason of the square portion of the body of the bolt engaging the walls of the square perforation in the washer. The nut 2 is dropped into the socket in the end of the other section B', and a washer 7, similar in all respects to washer 3, is placed on top of the nut, with the prongs embracing the sides of the nut, and is driven in till the washer seats upon the nut to hold the latter tight and prevent its turning. Any suitable means may be employed to hold the washer 7 against its being withdrawn when the bolt is screwed into the nut as the section ends are brought together. These means may consist of cement 8 or the like, cast around a central core, so as to leave a longitudinal perforation for the insertion of the bolt, as in Fig. 1, or, if desired, the washer may first be inserted into the socket with the prongs extending outward, the nut then being dropped in on top of the washer and embraced by the prongs. By means of a cylinder or bushing 8' the prongs are spread to engage the walls of the socket, as in Fig. 2.

Having thus described my invention, what I claim, and desire to secure by Letters Patent, is—

1. A means for preventing bolts turning, consisting in combination with a bolt having its shank adjacent to the head polygonal in cross-section, of a washer fitting over the bolt and having a perforation likewise polygonal, prongs on said washer adapted to be driven into the wood against which said head rests, a bushing embracing the bolt and abutting against the washer, and a nut fitting said bolt.

2. The combination of a bolt of approximately uniform diameter throughout its length, pronged washers fitting said bolt, and bushings adapted to embrace the bolt and to drive the prongs into the wood.

3. The combination of a bolt having a head seating in the socket in the end of a rail-section, a washer having prongs in alinement with the body of the bolt, a bushing on the bolt by which said prongs may be driven into the wood to anchor the bolt, a nut seating in a socket in the adjacent end of a second rail-section and means for anchoring said nut therein.

4. The combination of a headed bolt seating in a socket in the end of a rail-section, a nut seating in a corresponding socket in the adjacent end of a second section, and means including pronged washers embracing the bolt and nut, by which the bolt and the nut are anchored in their respective sockets.

In witness whereof I have hereunto set my hand.

OTTO NIEHAUS.

Witnesses:
N. P. COURTNEY,
ALBERT KAYSER.